United States Patent
Yasuda

[11] Patent Number: 5,262,709
[45] Date of Patent: Nov. 16, 1993

[54] PULSE MOTOR CONTROL CIRCUIT
[75] Inventor: Akio Yasuda, Yokohama, Japan
[73] Assignee: Matsushita Electric Industrial Co. Ltd., Osaka, Japan
[21] Appl. No.: 831,928
[22] Filed: Feb. 6, 1992
[30] Foreign Application Priority Data Feb. 27, 1991 [JP] Japan .................... 3-032688

[51] Int. Cl.$^5$ .............................. H02P 8/00
[52] U.S. Cl. .................... 318/696; 318/700; 318/705; 318/711; 318/715; 318/719; 318/721
[58] Field of Search ............... 318/700, 705, 711, 715, 318/719, 721, 696

[56] References Cited

U.S. PATENT DOCUMENTS 3,812,414 5/1974 Abraham et al.
4,348,625 9/1982 Sharp ................... 318/757
4,575,667 3/1986 Kurakake ................ 318/803

FOREIGN PATENT DOCUMENTS 1579121 11/1980 United Kingdom.

Primary Examiner—William M. Shoop, Jr.
Assistant Examiner—Karen Masih
Attorney, Agent, or Firm—Stevens, Davis, Miller & Mosher

[57] ABSTRACT

A pulse motor control circuit for starting up and synchronizing a sync pulse motor (for use typically in factory automation or precise machining) with an external sync signal. The control circuit applies a starting drive pulse signal to start up and drive the motor to place it in synchronism with the external signal, and then switches the drive pulse signal to the external signal for the synchronous revolution of the motor. The starting drive pulse signal has a variable frequency which is varied from a frequency in the self-starting region to that of the external sync signal.

6 Claims, 4 Drawing Sheets

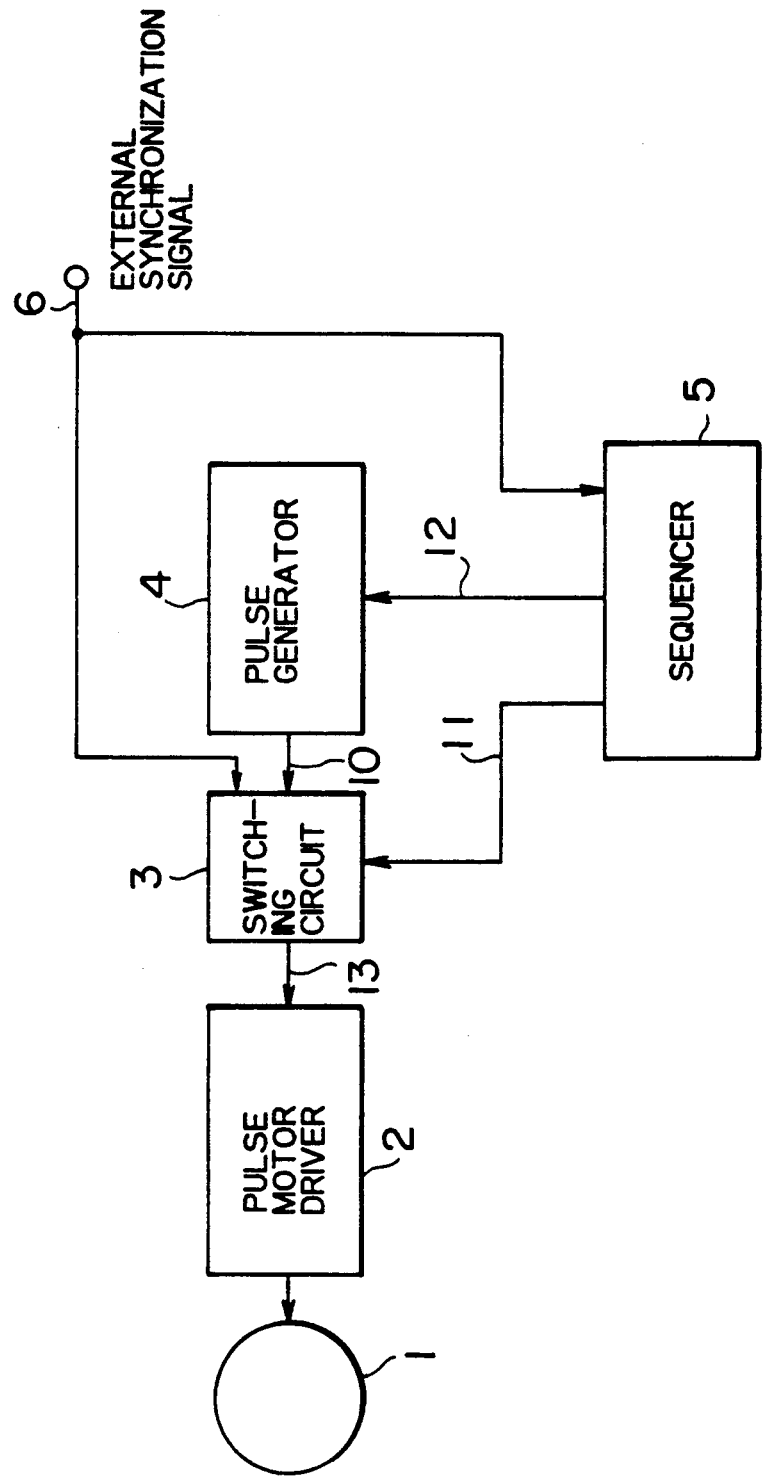

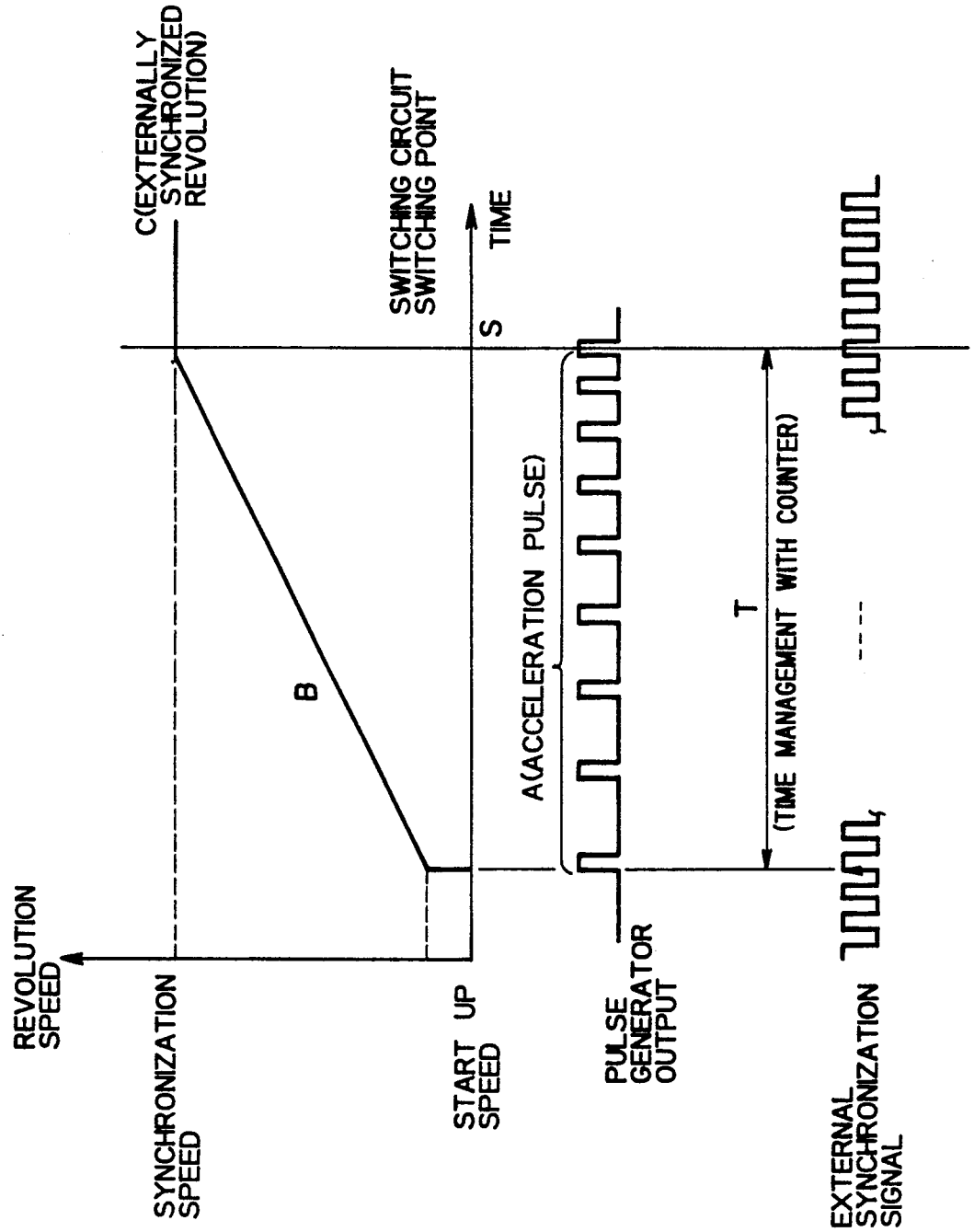

| SWITCH S | INPUT A | INPUT B | OUTPUT X | |
|---|---|---|---|---|
| L | L | ✻ | L | X = A |
| L | H | ✻ | H | X = A |
| H | ✻ | L | L | X = B |
| H | ✻ | H | H | X = B |

PULSE MOTOR CONTROL CIRCUIT

BACKGROUND OF THE INVENTION

The present invention relates to a pulse motor control circuit for use in driving a pulse motor in synchronism with an external synchronization signal, in factory automation (FA) facilities or precise machining facilities.

Conventionally, in such a pulse motor which is driven in synchronism with an external synchronization signal, the pulse motor 1 is driven by directly inputting the external synchronization signal 6 to a pulse motor driver 2 so that the pulse motor is utilized synchronous motor, in which the revolution speed proportional to a pulse frequency can be obtained, as shown in FIG. 5.

However, the pulse motor has characteristics as illustrated in FIG. 4. Namely, when the pulse frequency is within a self-start range, the pulse motor can be started in synchronism with the pulse frequency. However, when the frequency is increased, the pulse motor steps out and can not start at a frequency exceeding a certain frequency. This frequency is called a maximum self-start frequency. The frequency range exceeding the maximum self-start frequency is called the through range. The pulse motor cannot be started by a pulse signal having a frequency in this through range.

Accordingly, the conventional pulse motor control circuit encounters a problem that stepping out of the pulse motor is caused when the external synchronization pulse signal has a pulse frequency in the through range and the pulse motor can not be started.

SUMMARY OF THE INVENTION

The present invention has been implemented to solve such problems in the prior art. Therefore, it is an object of the present invention to provide a pulse motor control circuit which can start up a pulse motor for synchronous rotation in response to an external synchronization signal having a pulse frequency in the through range exceeding the self-start range.

According to one aspect of the present invention, the pulse motor control circuit comprises a pulse generator for generating an accelerating/decelerating pulse of a sequentially variable frequency, a pulse motor driver for driving a pulse motor according to an input pulse signal, a switching circuit for switching an input signal to the pulse motor driver between an external synchronization signal and the pulse signal of the pulse generator, and a sequencer for controlling the operations of the switching circuit and the pulse generator. Thus the pulse motor is started at a frequency within the self-start range and accelerated by the pulse signal of the generator having its frequency toward that of the external synchronization signal, so that the motor revolution is obtained in synchronism with the external synchronization signal.

Accordingly, by the present invention, the pulse motor is started up within the self-start range by the pulse generator and subsequently accelerated to the frequency in the vicinity of the frequency of the external synchronization signal. Then, by the control signal from the sequencer, the switching circuit is switched to drive the pulse motor with the external synchronization signal. Through this process, revolution of the pulse motor can be achieved in synchronism with the external synchronization signal having a pulse frequency within the through range exceeding the selfstart range.

BRIEF DESCRIPTION OF THE DRAWINGS

FIG. 1 is a block diagram of the first embodiment of a pulse motor control circuit according to the present invention;

FIG. 2 is an explanatory illustration showing operation of the circuit of FIG. 1;

DESCRIPTION OF THE PREFERRED EMBODIMENT

Figures 3A, 3B:
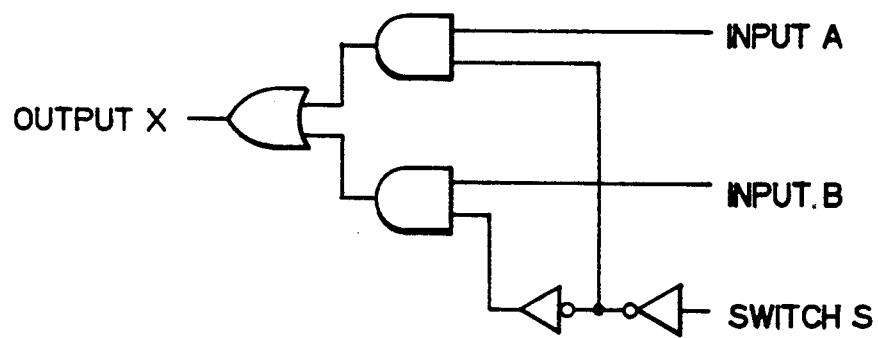
FIG. 3A is a circuit diagram of a switching circuit employed in the circuit of FIG. 1.
FIG. 3B is a truth table of the switching circuit in the circuit of FIG. 1.
Figure 4:
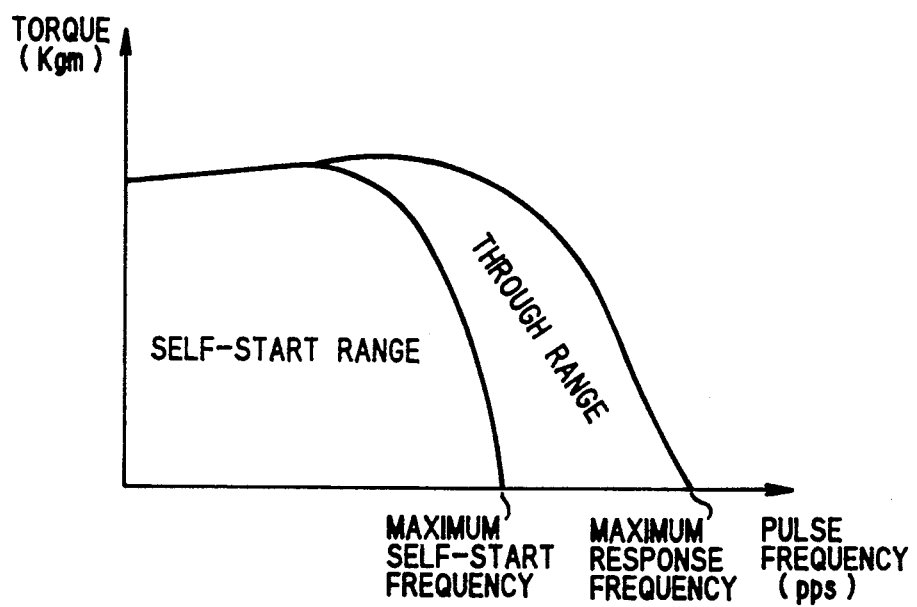
FIG. 4 is a chart showing speed-torque characteristics of the pulse motor.
Figure 5:
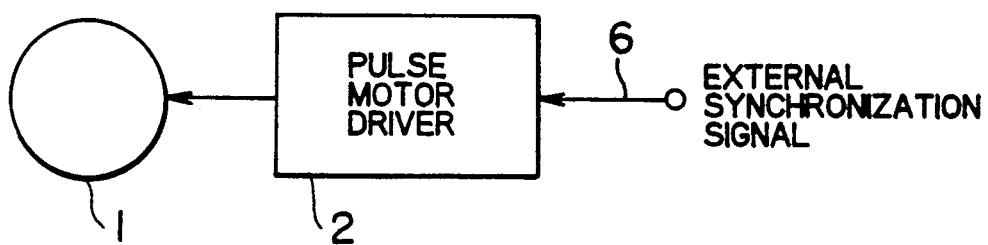
FIG. 5 is a block diagram of the conventional pulse motor control circuit.

FIG. 1 shows one embodiment of the present invention. In FIG. 1, the reference numeral 1 denotes a pulse motor driven by a pulse motor driver 2. The reference numeral 3 denotes a switching circuit selecting pulse signals to be inputted to the pulse motor driver 2. The switching circuit 3 has the circuit construction as illustrated in FIG. 3A and, as shown in FIG. 3B, when the switching signal S is L (Low), it selects an input A, and when the switching signal S is H (High), it selects an input B. The reference numeral 4 denotes a pulse generator which generates an accelerating(and/or) decelerating pulse signal 10 having a sequentially variable frequency. The reference numeral 5 denotes a sequencer which has a sequence control function and a counter function and outputs a switching control signal 11 for controlling the switching circuit 3 and an accelerating and decelerating pulse generation signal 12 for starting the pulse generator 4. The reference numeral 6 denotes an input terminal for applying an external synchronization signal input to the switching circuit 3 and the sequencer 5.

The operation of the above-mentioned embodiment will be described herebelow. In the foregoing embodiment, upon starting of the pulse motor, the sequencer switches the input of the switching circuit 3 to select the pulse signal 10 from the pulse generator 4 by the switching circuit control signal 11, and then applies the accelerating/decelerating pulse generation signal 12 to the pulse generator 4. By this, in the case as shown by A in FIG. 2, the pulse generator 4 generates an accelerating pulse signal 10. It should be noted that pulse signal 10 includes pulses at a frequency that is increased or decreased by sequencer 5. This increase or decrease is done independently of the frequency of the external synchronization signal. The generated pulse signal 10 is then inputted to the pulse motor driver 2 via the switching circuit 3. The pulse motor driver 2 receiving the accelerating pulse signal 10 drives the pulse motor 1. Therefore, the pulse motor 1 is started up and accelerated as shown by B in FIG. 2. Furthermore, at the time (the point S in FIG. 2), at which the output pulse of the pulse generator 4 is substantially equal to the frequency of the external synchronization signal 6, the sequencer 5 switches the input of the switching circuit 3 to select the external synchronization signal 6 with the switching circuit control signal 11. In order to provide that the output pulse of the pulse generator 4 and the external synchronization signal 6 are put in synchronization with each other at the time (s), the external synchronization signal 6 is also inputted to the sequencer 5. The acceleration period (the time T in FIG. 2) of the acceleration pulse of the pulse generator 4 is managed by the counter function of the sequencer 5 for determining the timing of the switching point (the point S). After the switching of the circuit 3, the pulse signal 13 to be inputted to the pulse motor driver 2 becomes the external synchronization signal 6. Then, the revolution of the pulse motor 1 is caused to be in synchronism with the external synchronization signal 6, as illustrated by C in FIG. 2.

With the above-mentioned embodiment, the switching circuit 3 is initially switched by the sequencer 5 to select and apply the acceleration/deceleration pulse of the pulse generator 4 to the driver 2 so that the pulse motor is started up by the frequency within the self-start range. Then, the pulse motor 1 is accelerated to the revolution speed approximately corresponding to the frequency of the external synchronization signal 6. Thereafter, the switching circuit 3 is switched by the sequencer 5 to select and apply the external synchronization signal 6 to the driver 2 to drive the pulse motor 1. Therefore, the above embodiment is advantageous in the capability of driving the pulse motor in synchronism with the external synchronization signal even when the frequency of the external synchronization signal is within the through range exceeding the self-start range.

It should be noted that, in the embodiment, though the pulse generator 4 generates the acceleration pulse which sequentially increases the frequency, the pulse generator 4 can also generate a deceleration pulse which sequentially decreases the frequency. Therefore, for decelerating and stopping the pulse motor 1 driven at a high speed in synchronism with the external synchronization signal, inputs of the pulse motor driver 2 can be switched from the external synchronization signal to such a deceleration pulse signal of the pulse generator 4 to gradually decelerate the motor to stop.

Furthermore, though the foregoing description has been given in that the shown embodiment drives the pulse motor 1 in synchronism with the external synchronization signal having the frequency in the through range exceeding the self-start range, the external synchronization signal, of course, can have the pulse frequency within the self-start range. Even in such a case, with the acceleration and deceleration pulse signal of the pulse generator 4, smooth start up and termination of the motor driving can be obtained with substantially no shock. Therefore, the shown embodiment can provide enhanced smoothness in driving and stopping the pulse motor in comparison with that directly applying the external synchronization signal 6 or instantly terminating the external synchronization signal.

What is claimed is:

1. A pulse motor control circuit comprising:
   pulse motor driver means for driving a pulse motor;
   pulse generator means for generating an acceleration/deceleration output pulse signal having a sequentially varying frequency
   switching circuit means for selectively applying, in sequence, to said driver means the output signal of said pulse generator and an external synchronization signal; and
   sequencer means for controlling said switching circuit means in selectively applying the output pulse signal and the synchronization signal to said river means and for controlling said pulse generator means in generating said output pulse signal.

2. A pulse motor control circuit as set forth in claim 1, wherein said driver means drives said pulse motor in synchronism with the output pulse signal of the pulse generator means at start up and stopping of the pulse motor and in synchronism with the external synchronization signal during synchronous driving of the pulse motor.

3. A pulse motor control circuit as set forth in claim 1, wherein said output pulse signal includes an acceleration pulse having a sequentially increasing frequency for start up and subsequent acceleration of the pulse motor so as to cause the drive pulses being supplied by said driver means to the pulse motor to be in synchronism with said external synchronization signal which has a pulse frequency in a range beginning within a self-start range of said pulse motor and ending in a through range.

4. A pulse motor control circuit as set forth in claim 1, wherein said output pulse signal includes a deceleration pulse having a sequentially decreasing frequency for decelerating and stopping the pulse motor in synchronism with the deceleration pulse.

5. A pulse motor control circuit as set forth in claim 1, wherein said output pulse signal comprises acceleration/deceleration output pulses having a frequency that is controllably increased or decreased by said sequencer means independently of a frequency of said synchronization signal.

6. A pulse motor control circuit as set forth in claim 1, wherein said sequencer means controls said switching circuit means to switch between said output pulse signal and said synchronization signal are in synchronization with one another.

* * * * *